(12) United States Patent
Danilychev

(10) Patent No.: US 6,852,981 B2
(45) Date of Patent: Feb. 8, 2005

(54) ULTRAVIOLET RADIATION INTENSITY METER

(76) Inventor: Vladimir A Danilychev, 4501 Pinyon Tree La., Irvine, CA (US) 92612

( * ) Notice: Subject to any disclaimer, the term of this patent is extended or adjusted under 35 U.S.C. 154(b) by 179 days.

(21) Appl. No.: 10/287,759

(22) Filed: Nov. 4, 2002

(65) Prior Publication Data

US 2004/0084627 A1 May 6, 2004

(51) Int. Cl.⁷ .................................................. G01J 1/02
(52) U.S. Cl. ....................................................... 250/372
(58) Field of Search ......................................... 250/372

(56) References Cited

U.S. PATENT DOCUMENTS

| | | |
|---|---|---|
| 3,574,443 A | 4/1971 | Nanba |
| 3,851,970 A | 12/1974 | Adler et al. |
| 3,999,061 A | 12/1976 | McLaughlin et al. |
| 4,201,916 A | 5/1980 | Ellner |
| 4,212,535 A | 7/1980 | Sanders et al. |
| 4,535,244 A | 8/1985 | Burnham |
| 4,608,492 A | 8/1986 | Burnham |
| D286,298 S | 10/1986 | May et al. |
| 4,704,535 A | 11/1987 | Leber et al. |
| 4,851,685 A | 7/1989 | Dübgen |
| 5,382,799 A | 1/1995 | May |
| 6,144,036 A | 11/2000 | Danilychev |
| 6,555,823 B2 * | 4/2003 | Kuhns et al. ............... 250/372 |

* cited by examiner

*Primary Examiner*—Constantine Hannaher
*Assistant Examiner*—Shun Lee
(74) *Attorney, Agent, or Firm*—Stetina Brunda Garred & Brucker

(57) ABSTRACT

The present invention relates to single, dual and multiple channel ultraviolet radiation measurement devices for obtaining a dosage level and an intensity level of an ultraviolet radiation source directed at an irradiation target. The device includes a measurement sensor having a light pathway formed between first and second ends. An internal light guide is positioned along the light pathway adjacent the first end. An external light guide chamber is formed along the light pathway adjacent the second end and extending toward the internal light guide. A light scattering member is positioned along the light pathway. An electric charge generating unit is positioned adjacent the light pathway, an electric charge storage unit is electrically connected in parallel with the electric charge generating unit, a resistive member is selectively electrically connectable in parallel with the electric charge storage unit, and an electrometric unit is electrically connected to the electric charge storage unit.

40 Claims, 3 Drawing Sheets

ULTRAVIOLET RADIATION INTENSITY METER

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to the field of measurement devices and more particularly to those directed toward measuring ultraviolet radiation. It is well known in the scientific community that ultraviolet radiation has the distinctive ability to cut electrons from an atom or molecule, thereby creating an electric charge. The amount of free electrons and total electric charge generated by ultraviolet radiation is proportional to the amount or quanta and total energy of the ultraviolet radiation applied to the object in which the electric charge is generated. The process of generating an electric charge via the exposure of an object to ultraviolet radiation does not require any external energy, a battery, or power supply, but rather requires only the ultraviolet radiation itself.

The process of cutting an electron from an atom or molecule is extremely fast, and usually less than about $10^{-13}$ seconds. Accordingly, an electric charge may be created by continuous ultraviolet radiation, as well as by pulsed ultraviolet radiation. The value of the electric charge generated by the ultraviolet radiation is generally very small, and sometimes almost unmeasurable. However, with very high intensities of ultraviolet radiation as are typically employed in industrial applications, such high intensities allow the electric charge created by the ultraviolet radiation to be measured, thus allowing for the dose of the ultraviolet radiation applied to an irradiated object to be measured.

Ultraviolet radiation measuring devices (often referred to as "radiometers and dosimeters") are frequently used in various industries, including the optical lens industry, the ultraviolet curing industry, and the ultraviolet photolithography and printing industry. Prior art ultraviolet radiation measuring devices typically include a sensor for producing an electrical signal under the influence of ultraviolet radiation, and a display for showing the value of the ultraviolet radiation level. In addition to the sensor and display, these prior art devices include electronic circuitry which is used to convert the electrical signal produced by the sensor from the exposure thereof to the ultraviolet radiation to a form that is presentable on the display. Such electronic circuitry typically includes integrating and amplifying units, as well as other electronic components. Subsequent to the electronic integration of the signal, this "sample and hold" electronic circuitry is operable to present on the display a measured dose of the ultraviolet radiation applied to the sensor, as well as a peak intensity of the ultraviolet radiation.

However, in the prior art ultraviolet radiation measuring devices, the sensor, as well as other electronic components of the electronic circuitry, require electric power for the proper operation thereof. As such, the prior art measuring devices must also be provided with internal and/or external power supplies to provide electrical power to both the sensor and electronic circuitry thereof. Additionally, such prior art measuring devices are typically very complex in construction, and susceptible to failure due to the relative complexity of the electronic circuitry therein.

In U.S. Pat. No. 6,144,036 previously issued to Applicant and incorporated herein by reference, an ultraviolet radiation dosimeter is disclosed which generally measures dosage levels of ultraviolet radiation from an ultraviolet radiation source. However, improvements have been discovered which fulfill a need in the industry for an ultraviolet radiation dosimeter which is compatible with existing ultraviolet radiation source devices, able to measure intensity levels continuously, and able to receive measurement data from multiple light guides, including those from existing ultraviolet radiation source devices.

In this regard, it has been discovered that it is desirable to measure the rate of forming an electric charge, or intensity level, from the ultraviolet radiation source. More specifically, ultraviolet radiation sources use lamps and/or bulbs which have an unpredictable life expectancy. Over time, the lamps may degrade and generally provide a decreased intensity when compared with a new lamp or one which is capable of providing ultraviolet radiation at full strength. It is generally difficult to determine when replacement is necessary unless the amount of ultraviolet radiation emitting from the lamp is measured. Disadvantageously, lower than expected ultraviolet radiation emitted from the lamp may cause the irradiation target to be irradiated for an improper length of time. However, by measuring the intensity level of such ultraviolet radiation, the lamp and associated reflectors can be replaced at precisely the proper time to thereby ensure uninterrupted use of the lamp.

Additionally, during ultraviolet radiation spot curing, fluctuations in AC line voltage, ambient temperature and humidity may cause the power supplied to the ultraviolet radiation source to be adversely affected. For example, power can vary under the influence of these factors by as much as up to plus or minus 50% in any given day. In providing a ultraviolet radiation device which measures the intensity level of the ultraviolet radiation emitted therefrom, such adverse effects on available power may be compensated for by altering and controlling the ultraviolet radiation exposure time.

Additionally, while several prior art dosimeters and ultraviolet light source devices are available, such devices generally fail to provide a simplified measurement device which includes built-in light guides or has the ability to receive external light guides from existing ultraviolet light source devices while measuring ultraviolet radiation being irradiated at a target. While some combination devices exist which integrate proprietary dosimeters into the ultraviolet radiation source devices, such dosimeters are specifically designed to calibrate and measure the ultraviolet radiation being emitted from its own light guide, not that of other ultraviolet radiation source devices.

It is also desirable to determine such intensity level measurements during spot curing and other applications without interrupting such processes. In particular, it has been discovered that unpredictable results sometimes occur during spot curing where the actual ultraviolet radiation being emitted from an ultraviolet radiation source is inaccurate with respect to the expected ultraviolet radiation dosage and intensity levels. An operator recognizing this inaccuracy typically must disconnect the ultraviolet radiation source from the irradiation target and to measure the actual ultraviolet radiation. As previously described, such inaccuracies may result from a degraded lamp. As a result, uneven or inaccurate spot curing may occur since disconnection of the ultraviolet radiation source from the initially irradiated location requires realignment of the ultraviolet radiation source with that precise location. Such precision is often not achieved and the irradiated target generally becomes irregularly cured with some areas being exposed to too much ultraviolet radiation while other areas are exposed with too little ultraviolet radiation. Additionally, disconnection of the ultraviolet radiation source from the irradiation target may cause additional inaccurate curing since the operator must approximate remaining exposure time required after disconnection.

Thus, it is desirable to monitor the intensity level of the ultraviolet radiation source so as to determine whether irradiation exposure time should be adjusted due to a degradation in the lamp's intensity level, power fluctuations, and to be able to do so with a device which is compatible with existing ultraviolet radiation source devices. The prior art generally fails to provide such measurements on the rate of charging and/or intensity of the ultraviolet radiation source without requiring interruption of irradiation, and further fails to provide measurement devices which may receive existing light guides from ultraviolet radiation source devices. The present invention addresses these deficiencies by providing an ultraviolet radiation measurement device which may obtain a dosage level and an intensity level of an existing ultraviolet radiation source during irradiation of a target without interruption.

BRIEF SUMMARY OF THE INVENTION

The present invention specifically addresses and alleviates the above-identified deficiencies in the art. In this regard, the present invention provides an ultraviolet radiation measurement device which is generally compatible with existing ultraviolet radiation source devices by receiving light guides attached to such ultraviolet radiation source devices, measuring the dosage and intensity levels of ultraviolet radiation emitted therefrom on a continuous basis, and further outputting measurements from multiple light guides.

In accordance with the present invention, there is provided an ultraviolet radiation measurement device for obtaining a dosage level and an intensity level of ultraviolet radiation from an ultraviolet radiation source directed at an irradiation target. The device includes a measurement sensor which has a first end, an opposed second end and a light pathway formed between the first and second ends. The measurement sensor also includes an internal light guide positioned along the light pathway adjacent the first end. An external light guide chamber may be formed along the light pathway adjacent the second end and extending toward the internal light guide. The external light guide chamber is sized and configured to receive an external light guide therein. A light scattering member may be positioned along the light pathway adjacent the first end. The light scattering member is sized and configured to receive the ultraviolet radiation via the light pathway. An electric charge generating unit is positioned adjacent the light pathway. The electric charge generating unit is sized and configured to be irradiated by the ultraviolet radiation source and to convert the ultraviolet radiation into an electric charge proportional to the ultraviolet radiation. An electric charge storage unit electrically connected in parallel with the electric charge generating unit and operable to store the electric charge produced thereby is provided. A resistive member is selectively electrically connectable in parallel with the electric charge storage unit and operable to dissipate the electric charge from the electric charge storage unit during irradiation by the ultraviolet radiation when connected to the storage unit. The measurement sensor also includes an electrometric unit electrically connected to the electric charge storage unit. The electrometric unit is further configured to receive the electric charge and operable to selectively output a reading corresponding to the dosage level and the intensity level of the ultraviolet radiation being directed at the irradiation target. The electrometric unit preferably has an input impedance in ohms of not less than about 20 U/q.

The electrometric unit may further include a measurement switch disposed thereon and moveable between intensity and dosage positions. The intensity position electrically connects the resistive member to the electric charge storage unit and is operable to output the intensity level to the electrometric unit. The dosage position electrically disconnects the resistive member from the electric charge storage unit and is operable to output the dosage level of the electrometric unit. The dosage level is outputted to the electrometric unit in a range of from about 1 mJ/cm$^2$ to about 2000 J/cm$^2$. The intensity level is outputted to the electrometric unit in a range of from about 1 mW/cm$^2$ to about 100 W/cm$^2$.

The electric charge generating unit, as described in further detail below, is preferably electrically connected to the electric charge storage unit via a pair of cables extending therebetween and is further releasably detachable from the electric charge storage unit. The cables each have an insulation resistance of not less than about 100 megaohms and a length in a range of from about 2 inches and about 200 inches. Even more preferably, the cables are formed to engage a respective channel port on the electrometric unit. During operation, the cables may be fixedly attached to the electrometric unit prior to operation of the measurement device.

The electrometric unit may further include a repulsive charge electrometer and a display which is preferably a digital panel electrometer having an input impedance of not less than about 100 megaohms. The electrometric unit may convert the electric charge stored in the electric charge storage unit to a reading corresponding to the dosage level and the intensity level of the ultraviolet radiation source to thereby present the reading on the display. In this respect, a power supply electrically connected to the electrometric unit may be provided solely for supplying power to the display thereof. Preferably the power supply is a battery having an electric capacity of at least 10 mAh. Additionally, a switch electrically connected in series between the electrometric unit and the power supply for selectively applying power from the power supply to only the display of the electrometric unit may be provided for operating the display. The switch has an insulation resistance of not less than about 50 megaohms.

The internal light guide is preferably formed having a diameter in the range of from about 2 mm to about 10 mm fabricated from a material such as quartz, glass, plastic, liquid, ceramic and equivalents thereof. Due to the transparent nature of the internal light guide, ultraviolet radiation may be received therethrough along the light pathway. An additional external light guide, which may be fabricated from the same material as the internal light guide, may be inserted into the external light guide chamber along the light pathway to provide delivery of ultraviolet light from the ultraviolet light source to the irradiation target through the internal light guide.

Advantageously, the measurement sensor may be formed having a single channel, dual channels, or multiple channels for receiving measurements from multiple light guides. The electrometric unit may further include first and second channel ports disposed thereon. The first and second channel ports may be selectively placeable into electrical communication with the measurement sensor. A light guide sensor switch may be disposed on the electrometric unit and is selectable between first and second light guide sensor switch positions. The first and second light guide sensor switch positions connect respective ones of the first and second channel ports to the electric charge storage unit.

The light scattering member is preferably fabricated from a material such as TEFLON®, TEFZEL®, low density polyethylene, medium density polyethylene, high density polyethylene, and equivalents thereof. The light scattering member is preferably a substantially circular/disc-shaped or tube-shaped transparent clad which is positioned within the measurement sensor along the light pathway so as to receive the ultraviolet radiation therealong.

A directional coupler may be electrically connected in series between the electric charge generating unit and the electric charge storage unit for allowing the electric charge to flow in only a prescribed direction therebetween. The directional coupler may be a silicon rectifier, a germanium rectifier, or equivalents thereof. The electric charge storage unit preferably has a leakage impedance in ohms of not less than about 10 U/q where U is the electric potential of the storage unit in volts and q is the value of the stored electric charge in coulombs. The directional coupler preferably has a reverse impedance of not less than about 100 megaohms and a direct flow impedance of not more than about 10 megaohms. Additionally, an electric charge limiter may be electrically connected in series with the directional coupler for limiting the flow of the electric charge through the directional coupler. Preferably, the electric charge limiter is an electric resistor having a value in a range of from about 1 ohm and about 10 megaohms.

The electric charge generating unit preferably has a leakage impedance of not less than about 100 megaohms and generates not less than about 1 picocoulomb of the electric charge per 1 joule of ultraviolet radiation. The electric charge generating unit may be a vacuum phototube, a light emitting diode, a solid state photodiode, or any equivalents thereof.

The resistive member preferably has a resistance value of not greater than U/q, where U is the electric potential of the electric charge storage unit in volts, and q is the value of the electric charge stored in the electric charge storage unit in coulombs. Even more preferably, the resistive member is a resistor having a resistance value in a range of from about 100 ohms and about 10 megaohms.

An optical attenuator may be disposed between the ultraviolet radiation source and the electric charge generating unit for decreasing the amount of ultraviolet radiation to which the electric charge generating unit is exposed to a prescribed level. Additionally, an optical band filter may be disposed between the optical attenuator and the electric charge generating unit to limit a spectrum ultraviolet radiation to which the electric charge generating unit is exposed to within a prescribed range, preferably in a range of from about 185 nm to about 600 nm. Further, an optical window may be disposed between the optical band filter and the electric charge generating unit to protect the electric charge generating unit from dust and moisture. The electric charge generating unit, the optical attenuator, the optical band filter, the internal light guide, and the optical window may be disposed within a substantially cylindrical housing having an opening for permitting the passage of ultraviolet radiation from the ultraviolet radiation source or external light guide to the electric charge generating unit via the light pathway.

An electric charge discharge member may be electrically connected in parallel with the electric charge storage unit and operable to selectively discharge the electric charge stored within the electric charge storage unit for purposes of resetting the measurement device dosimeter for a new ultraviolet radiation measurement. The electric charge discharge member may be formed as electric switch having an insulation resistance of not less than about 50 megaohms.

Alternatively, a plurality of measurement sensors may be provided which may each be electrically connected to the electrometric unit. In this respect, the electrometric unit may output multiple dosage and intensity level readings from each of the measurements sensors. Advantageously, these measurement sensors may be placed at several different locations to monitor multiple targets or to monitor the degradation level of the ultraviolet radiation being directed at the target or targets.

Where multiple measurement sensors are provided, a plurality of channel ports may be disposed on the electrometric unit. Each of the plurality of channel ports being selectively placeable into electrical connection with a respective one of the plurality of measurement sensors. In dual channel, a light guide sensor switch may also be disposed on the electrometric unit and movable between first and second light guide switch positions. The first and second light guide senor switch positions connecting respective ones of the plurality of measurement sensors to the electrometric unit. Where a plurality of measurement sensors are provided, the light guide sensor switch is movable between a plurality of light guide sensor switch positions.

BRIEF DESCRIPTION OF THE DRAWINGS

These as well as other features of the present invention will become more apparent upon reference to the drawings wherein:

FIG. 2A is a view taken along lines 1A—1A of FIG. 1 illustrating the measurement device constructed in accordance with the present invention.

DETAILED DESCRIPTION OF THE INVENTION

The detailed description, as set forth below in connection with the appended drawings, is intended as a description of the presently preferred embodiments of the invention, and is not intended to represent the only form in which the present invention may be constructed or utilized.

Figure 1:
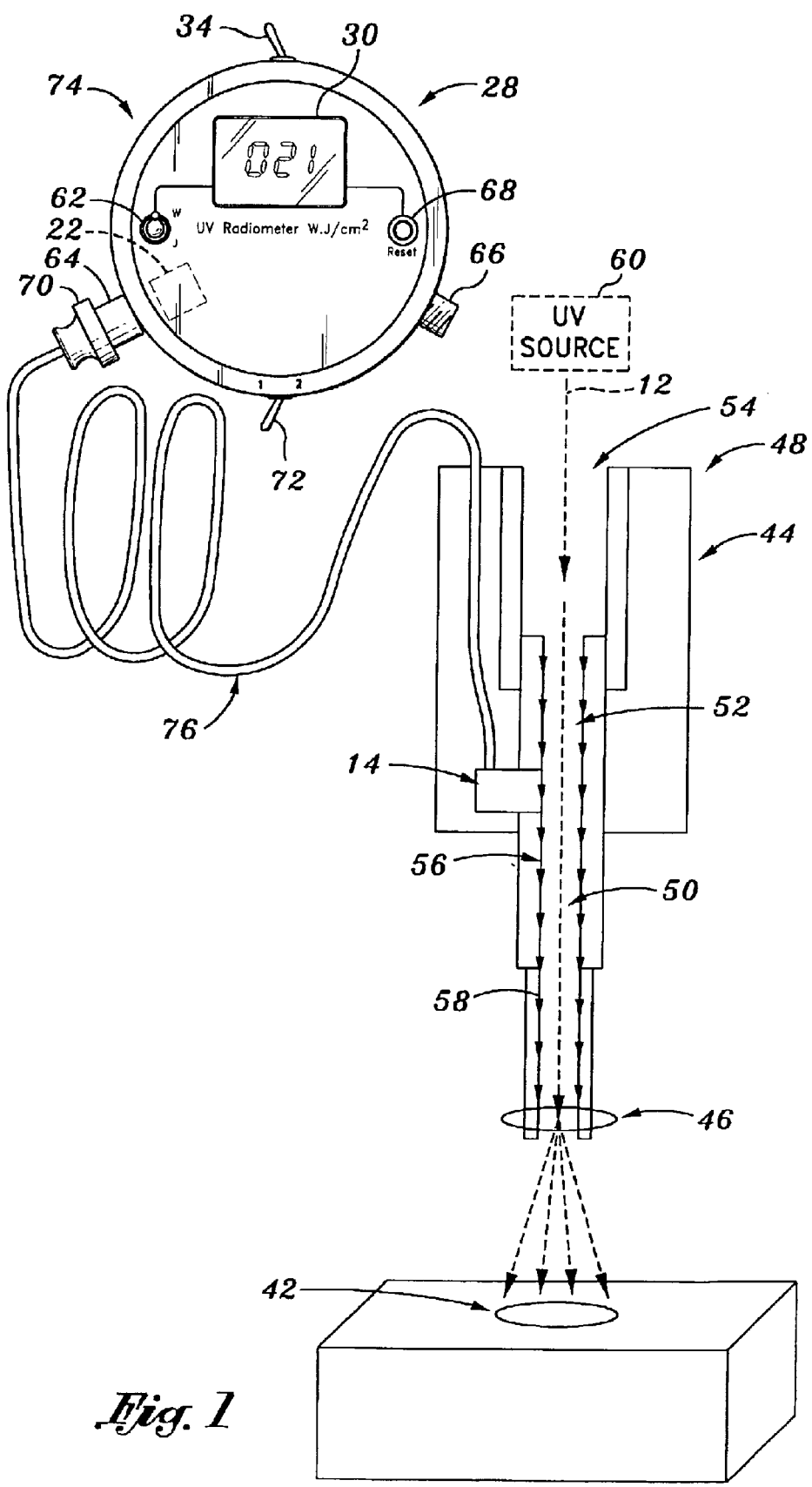
FIG. 1 is a plan view of the electrometric unit and the measurement device constructed in accordance with the present invention.

Referring now to the drawings wherein the showings are for purposes of illustrating a preferred embodiment of the present invention only, and not for purposes of limiting the same, FIG. 1 shows an ultraviolet radiation measurement device 10 constructed in accordance with the present invention. More particularly, the ultraviolet radiation measurement device 10 obtains a dosage level and an intensity level of an ultraviolet radiation source 60 which is directed at an irradiation target 42. The device 10 includes a measurement sensor 44 which has a first end 46, an opposed second end 48, and a light pathway 50 formed between the first and second ends 46 and 48. Even more preferably, the measurement sensor 44 defines an opening at each of the first and second ends 46 and 48 so as to allow ultraviolet radiation 12 from the ultraviolet radiation source 60 to pass therethrough. The measurement sensor 44 is preferably fabricated from an aluminum or stainless steel material.

As shown in FIG. 1, in one embodiment of the present invention, the measurement sensor 44 may be formed having an internal light guide 52 positioned along the light pathway 50 adjacent the first end 46. The internal light guide 52 is built-in to the measurement sensor 44 such that even without directly connecting the measurement sensor 44 to an ultraviolet radiation source 60, the measurement sensor 44 may receive ultraviolet radiation 12 from the ultraviolet radiation source 60.

The measurement sensor 44 may also define an external light guide chamber 54 formed along the light pathway 50 adjacent the second end 48 and extending toward the internal light guide 52. The external light guide chamber 54 is sized and configured to receive an external light guide therein. More specifically, an external light guide (not shown) may be disposed in the external light guide chamber 54 along the light pathway 50. Existing ultraviolet radiation sources include at least one light guide connected thereto for emitting ultraviolet radiation therefrom. For compatibility, the external light guide chamber 54 may receive such an external light guide and an electric charge generating unit 14, as described in further detail below, may be placed adjacent the scattering member 56 surrounding the internal light guide 52 for converting the ultraviolet radiation 12 into a proportional electric charge. In this respect, a light guide attached to a ultraviolet radiation source 60 device may be inserted into the external light guide chamber 54 along the light pathway 50 to further pass the ultraviolet radiation 12 therealong through the internal light guide 52 and ultimately at the irradiation target 42. Preferably, both the internal 52 and external light guides are substantially elongated and have a diameter from about 2 mm to about 10 mm. Even more preferably, the internal light guide 52 is fabricated from quartz, glass, plastic, liquid, ceramic or other equivalents thereof.

As further shown in FIG. 1, the measurement sensor 44 also includes a light scattering member 56 positioned along the light pathway 50 adjacent the first end 46. The light scattering member 56 is sized and configured to receive the ultraviolet radiation 12 from the ultraviolet radiation source 60 via the light pathway 50. Preferably, the light scattering member 56 is fabricated from a material such as TEFLON®, TEFZEL®, low density polyethlyene, medium density polyethlyene, high density polyethlylene, or equivalents thereof. The light scattering member 56 is preferably sized and shaped to fit within the measurement sensor 44 along the light pathway 50 and may be positioned adjacent the first end 46 such that ultraviolet radiation 12 emitted from the ultraviolet radiation source 60 may be received on the light scattering member 56 via the light pathway 50. The light scattering member 56 operates to split the ultraviolet radiation 12 into smaller ultraviolet radiation portions 58 from the main light flux thereof and directs these portions 58 partly to the electric charge generating unit 14 as will be described in further detail below. By splitting the ultraviolet radiation 12 into such portions 58, such ultraviolet radiation 12 is thus more controllable as compared to the total light flux of the ultraviolet radiation 12. As shown in FIG. 1, the light scattering member 56 may be formed having a substantial cylindrical shape resembling a tube which runs along a length of the sensor 44 such that the portions 58 are split throughout the length of the sensor 44.

Use of the light scattering member 56 is especially advantageous in applications where the irradiation target 42 is substantially unobstructed or at least obstructed to a degree of less than 10%. It is thus possible to allow up to 90% of the ultraviolet light to pass through the sensor. If anti-reflective coatings are applied to the internal light guide 52, up to 98% of the ultraviolet light may pass through the sensor. Further, by utilizing the light scattering member 56, uninterrupted measurements of the dosage level and intensity level of the ultraviolet radiation 12 may be taken since small multiple portions 58 are being split from the main light beam, i.e. ultraviolet radiation source 60, directed to the irradiation target 42. Additionally, the dosage level may be measured over selected time intervals to thereby monitor increase and/or decrease in dosage level. The light scattering member 56 may be positioned adjacent the first end 46 so as to allow the ultraviolet radiation 12 to be split into the portions 58 inside the measurement sensor 44 and adjacent the first end 46 to form a generally cylindrical array or pattern of small portions 58 along the light pathway 50 from the ultraviolet radiation 12 irradiating the target 42. In this respect, the light scattering member 56 may be selectively placed at positions within the measurement sensor 44 according to the specific type of application, e.g. ultraviolet spot curing.

Figure 2:
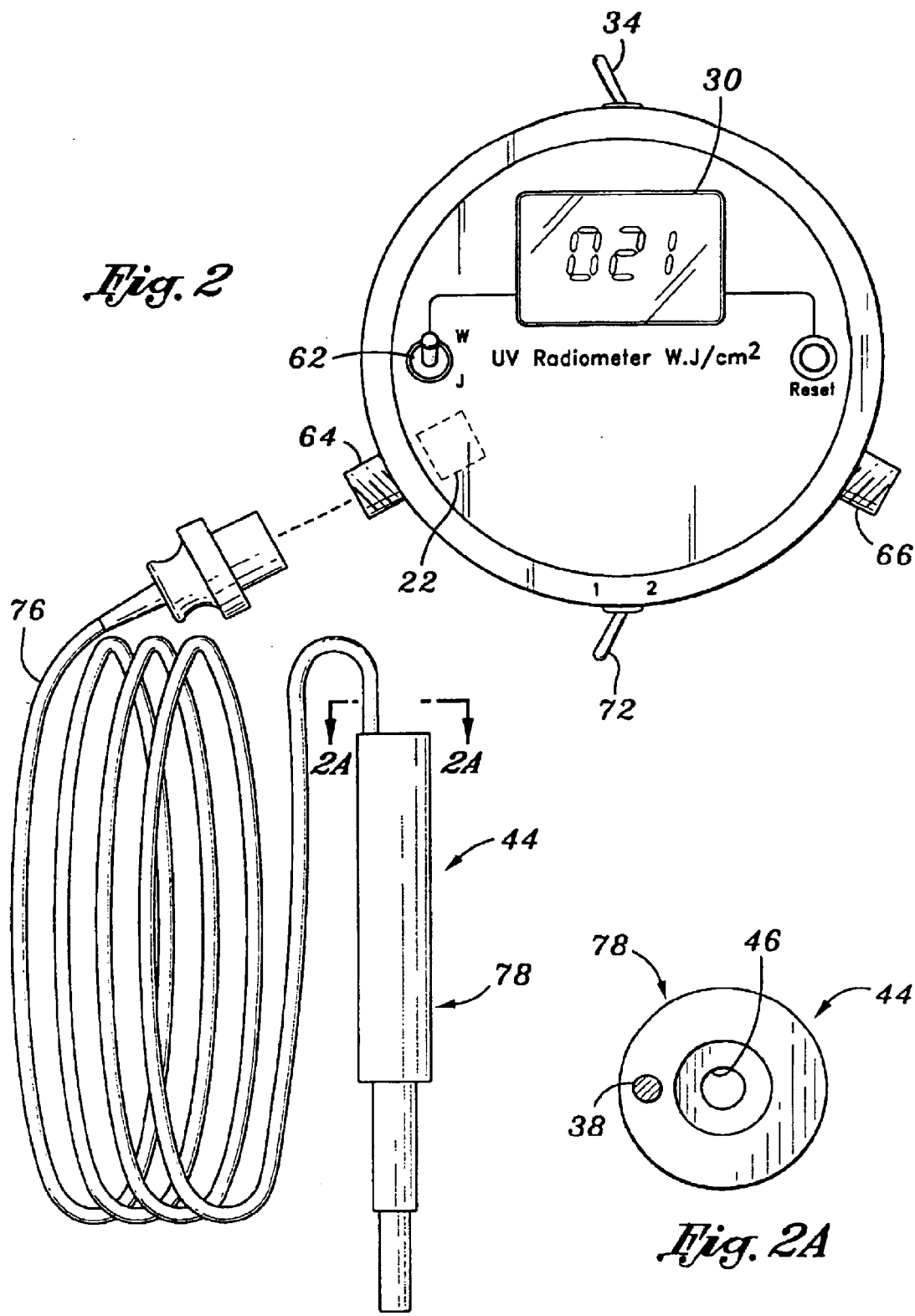
FIG. 2 is a front view of the electrometric unit and the measurement sensor constructed in accordance with the present invention.

As further shown in FIGS. 1, 2 and 2A, the measurement sensor 44 of the device 10 also includes an electric charge generating unit 14 positioned adjacent the light pathway 50. Preferably, the generating unit 14 is positioned adjacent the light scattering member 56 such that portions 58 of light split from the light scattering member 56 may be received by the generating unit 14 without interrupting irradiation of the target 42. The electric charge generating unit 14 is sized and configured to be irradiated by the ultraviolet radiation 12 and to convert a small portion of the ultraviolet radiation 12 into an electric charge proportional to the ultraviolet radiation 12. In the preferred embodiment, the generating unit 14 has a leakage impedance of not less than about 100 megaohms, and generates not less than about 1 picocoulomb of the electric charge per one joule of ultraviolet radiation 12. It is contemplated that the generating unit 14 may comprise either a vacuum phototube having a long wavelength cut-off equal to the long wavelength limit of the desired sensitivity of the measurement device 10, a light emitting diode (LED) having a peak emission wavelength equal to the long wavelength limit of the desired sensitivity of the measurement device 10, or a solid state photodiode having a reverse impedance of not less than about 100 megaohms. Those of ordinary skill in the art will recognize that the generating unit 14 may comprise any device capable of generating an electric charge in proportion to its level of exposure to the ultraviolet radiation 12.

An electric charge storage unit 22 is electrically connected in parallel with the electric charge generating unit 14 and operable to store the electric charge produced thereby. The storage unit 22 has a preferred leakage impedance in ohms of not less than about 10 U/q where U is the electric potential of the storage unit 22 in volts and q is the value of the stored electric charge in coulombs. A preferred storage unit 22 of the measurement device 10 is a capacitor having a leakage resistance of not less than about 100 megaohms. As will be discussed in more detail below, the storage unit 22 has the capability to maintain the electric charge stored therein for an extended period of time, and up to 24 hours after the electric charge is transferred thereto from the generating unit 14.

Figure 3:
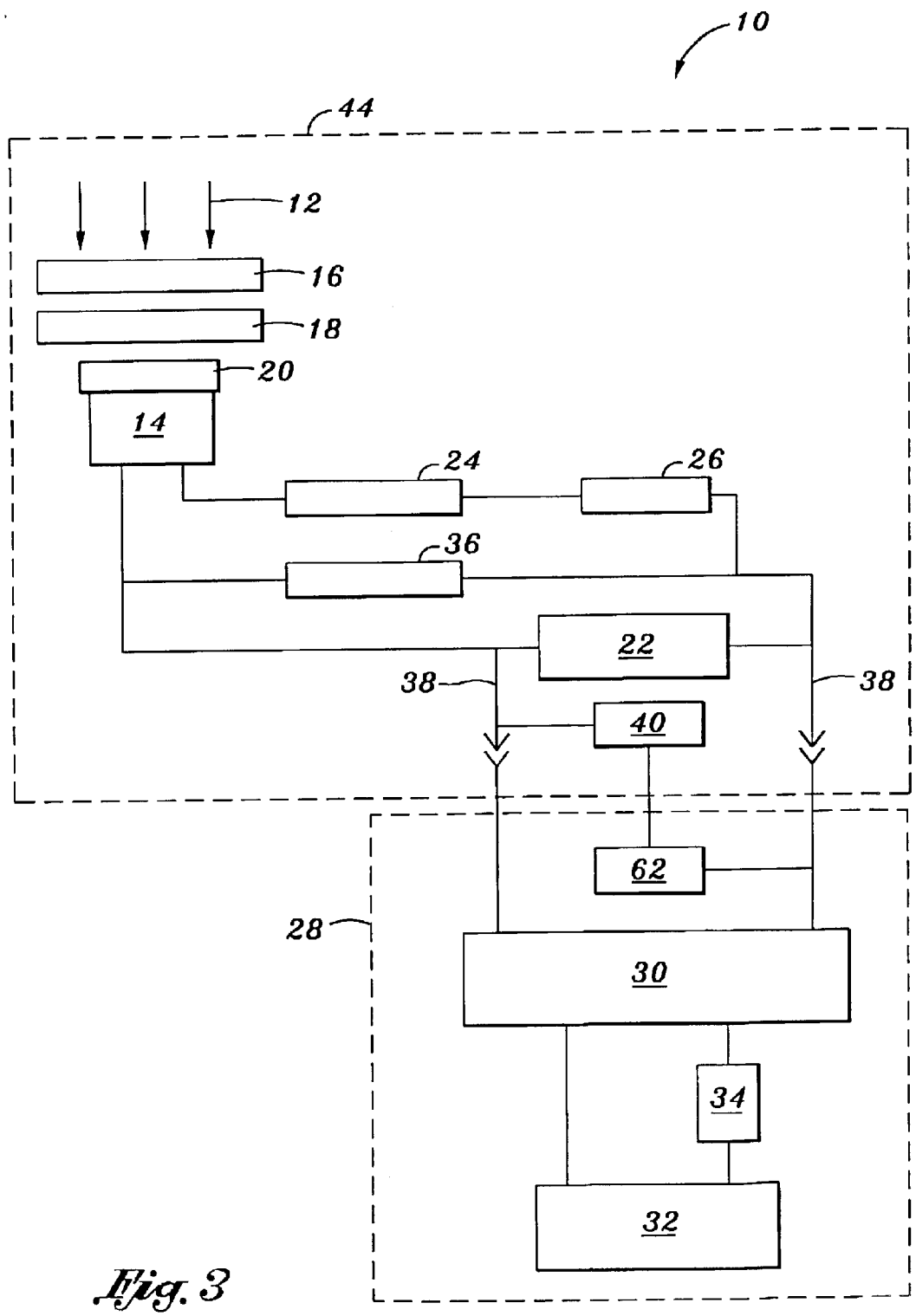
FIG. 3 is a block level diagram of the ultraviolet radiation dosimeter constructed in accordance with the present invention.

As shown in the schematic drawing of FIG. 3, the measurement sensor 44 also includes a resistive member 40 selectively electrically connectable in parallel with the electric charge storage unit 22 and operable to dissipate the electric charge from the electric charge storage unit 22 during irradiation by the ultraviolet radiation 12 when connected to the storage unit 22. Preferably, the resistive member has a resistance value of not greater than U/q, where U is the electric potential of the electric charge storage unit 22 in volts, and q is the value of the electric charge stored in the electric charge storage unit 22 in coulombs. Even more preferably, the resistive member 40 is a resistor having a resistance value in a range of from about 100 ohms and about 10 megaohms. In operation, the resistive member 40 may be selectively placed into electrical communication with the electric charge storage unit 22 such that portions of the charge are discharged therefrom. Such discharging allows for an intensity level of the ultraviolet radiation 12 to be measured.

The measurement device 10 also includes an electrometric unit 28 electrically connected in parallel with the storage unit 22 and including a display 30. The electrometric unit 28 is operable to measure the amount of the electric charge in the storage unit 22 by standard charge measurement techniques. The electrometric unit 28 is also operable to convert the electric charge to a reading corresponding to the amount of ultraviolet radiation 12 produced by the ultraviolet radiation source 60, and present the reading on the display 30. More particularly, the electrometric unit 28, which is able to detect the level of the electric charge, may be calibrated such that the value of the electric charge detected thereby is correlated to a particular ultraviolet radiation dosage level, thus allowing the reading presented on the display 30 to closely correspond to the ultraviolet radiation level without the need to refer to a separate conversion table for purposes of converting the value of the electric charge to an ultraviolet radiation reading. Advantageously, such calibration of the electrometric unit 28 may be assisted through the use of an electric charge limiter 26, as described in further detail below.

A preferred electrometric unit 28 for the measurement device 10 is a digital panel member having an input impedance of not less than about 100 megaohms. When the electrometric unit 28 comprises a digital panel member or an analog panel member including the display 30, the power supply 32 is needed to provide power to the display 30, and preferably comprises at least one lithium battery having an electric capacity of not less than about 10 mAh. When powered by a lithium battery, the value of the radiation measurement may be read for up to 24 hours to within about a two percent accuracy. An external power supply is needed only if a digital or analog electrometer is employed as the electrometric unit 28. In this respect, the electric power provided by the power supply is needed only to power the display 30 of the electrometric unit 28 so that it can present the reading corresponding to the measurement of ultraviolet radiation 12. The power provided by the power supply 32 is not needed for any other component of the measurement device 10. Since the total energy consumption of the display 30, and consequently the whole measurement device 10, is so low, the same can operate on a coin lithium battery for up to three to ten years, without replacing or recharging the battery after more than about 100,000 dose measuring events. It will be recognized that the need for the external power supply in the measurement device 10 can be completely eliminated if, rather than a digital or analog electrometer, the readings of the electronic charge are picked-up visually without any source of external electric energy via the use of a standard repulsive charge electrometer. However, the measurement device 10 may be configured to be powered by a standard AC line by connecting the electrometric unit 28 to a wall transformer and connecting the wall transformer to the AC line. The power supply 32 configured to be powered by the AC line is preferably configured to be a universal input at 90–240 VAC and 50–400 Hz.

An on/off switch 34 for selectively applying power from the power supply 32 to the electrometric unit 28 may be placed in electrical communication therewith. The switch 34 itself preferably has an insulation resistance of not less than about 50 megaohms. After the value of the electric charge in the storage unit 22 has been measured, the on/off switch 34 is depressed in order to provide power to the display 30 from the power supply 32. The display 30 will then present an ultraviolet radiation intensity and/or dosage level reading. The electrometric unit 28 is calibrated such that the reading presented on the display 30, which corresponds to the value of the electric charge stored in the storage unit 22, is representative of the amount of ultraviolet radiation 12 produced by the ultraviolet radiation source 60.

As shown in FIGS. 1 and 2, the electrometric unit 28 preferably includes a measurement switch 62 which is disposed on the electrometric unit 28 and is selectable between intensity and dosage positions. In the dosage position, the resistive member 40, shown in FIG. 3, is not electrically connected to the electric charge storage unit 22. By disconnecting the resistive member 40 from the electric charge storage unit 22, the dosage level of the ultraviolet radiation 12 emitted from the ultraviolet radiation source 60 may be outputted to the display 30 in units of $J/cm^2$. In the intensity position, the intensity level of the ultraviolet radiation 12 emitted from the ultraviolet radiation source 60 is outputted to the display in units of $W/cm^2$. To accomplish this, the resistive member 40 is electrically connected to the electric charge storage unit 22 when the measurement switch 62 is placed in the intensity position. Advantageously, the measurement switch 62 may be selected between the intensity and dosage positions without interrupting measurements or disconnecting either the internal light guide 52 or the external light guide from the irradiation target 42. Preferably, the measurement switch 62 is a toggle switch electrically connected in serial with the resistive member 40 and further being disposed on the electrometric unit 28.

While the measurement device 10 may obtain dosage and intensity levels of ultraviolet radiation 12 from the ultraviolet radiation source 60, in order for the proper operation thereof to occur, the measurement device 10 of the present invention requires a generally high level of ultraviolet radiation power. Preferably, the operational range of the measurement device 10 is limited to high power ultraviolet radiation with a total dosage starting from about 1 $mJ/cm^2$. Where industrial installations require high intensities of ultraviolet radiation, the operational range of the measurement device 10 is limited to the range of about 1 $mW/cm^2$ to about 100 $W/cm^2$.

The electrometric unit 28 includes a light guide sensor switch 72 disposed thereon which is selectable between first and second light guide switch positions. Advantageously, the light guide sensor switch 72 allows the circuitry of the electrometric unit 28 to switch between the first and second light guide switch positions. Preferably channel ports 64 and 66 are disposed thereon and configured to correspond to the first and second light guide switch positions such that separate readings received via the channel ports 64 and 66 may be outputted to the display 30 of the electrometric unit 28. For example, the measurement sensor 44 may be connected to the channel port 64 to output the intensity and dosage level measurements to the display while the light guide sensor switch 72 is in the first light guide switch position. An additional measurement sensor identical to measurement sensor 44 may be provided which is connected to the channel port 66 to output the intensity and dosage level measurements therefrom to the display while the light guide sensor switch 72 is in the second light guide switch position. It is not crucial whether the switch is placed into the first or second light guide switch positions in order to provide desired dosage and intensity level readings. It is anticipated that several channel ports may be provided for receiving measurements from a plurality of measurement sensors 44. The design of the electrometric unit 28 as having the channel ports 64 and 66 and further having the light guide sensor switch 72 allows a user to thus select the desired configuration based on the application. Therefore, it is thus possible to place an additional measurement sensor 44 at a different location relative to the irradiation target 42 to thereby provide a comparison.

As shown in FIG. 3, the measurement device 10 of the present invention further includes an optical attenuator 16 which is disposed between the ultraviolet radiation source 60 and the generating unit 14. The optical attenuator 16 is operable to decrease the incident power of the ultraviolet radiation 12 to which the generating unit 14 is exposed to a prescribed level. Preferably disposed between the optical attenuator 16 and the generating unit 14 is an optical band filter 18 which is operable to limit the spectrum of the ultraviolet radiation 12 to which the generating unit 14 is exposed to a prescribed bandwidth which is preferably in the range of from about 185 nm to about 600 nm. The optical attenuator 16 allows measurements of ultraviolet radiation 12 in the dosage range of about 1 mJ/cm$^2$ up to about 2000 J/cm$^2$ and an intensity range of about 1 mW/cm$^2$ up to about 100 W/cm$^2$. Preferably, if the ultraviolet radiation has a wavelength which falls outside the band of transmission of the optical band filter 18, such wavelengths are filtered out. As such, the filter 18 is an optical band filter that only allows ultraviolet radiation 12 within a prescribed range or bandwidth to be passed therethrough and ultimately measured.

In the measurement device 10, an optical window 20 is preferably disposed between the filter 18 and the generating unit 14 to protect the generating unit 14 from dust and moisture. As will be recognized, the optical window 20 is fabricated from a material which is transparent to the ultraviolet radiation 12. Additionally, the optical window 20 is preferably placed over an opening within the generating unit 14 which allows for the passage of the ultraviolet radiation 12 thereinto. However, it is contemplated that the optical window 20 may be fabricated from an optical material having properties which allow for the transmission of the desired bandwidth of the ultraviolet radiation 12 therethrough, thus eliminating the need for the separate filter 18 within the measurement device 10.

As further shown in FIG. 3, a directional coupler 24 is electrically connected in series between the generating unit 14 and the storage unit 22 of the present measurement device 10. The directional coupler 24 allows the electric charge to flow in only a prescribed direction between the generating unit 14 and the storage unit 22. In this respect, the directional coupler 24 directs the electric charge away from the generating unit 14 in a single direction. The preferred directional coupler 24 of the measurement device 10 has a reverse impedance of not less than about 100 megaohms, and a direct flow impedance of not more than about 10 megaohms. The directional coupler 24 may comprise either a silicon rectifier, a germanium rectifier, or any other component providing reverse and direct flow impedance in the desired ranges. Additionally, the generating unit 14 itself may serve as the directional coupler, therefore eliminating the need for a separate directional coupler element within the measurement device 10.

In addition to the above-described components, the present measuring device 10 includes an electric charge limiter 26 which is electrically connected in series with a directional coupler 24 and is used for limiting the flow of the electric charge through the directional coupler 24. Thus, the limiter 26 limits the value of the electric charge emanating from the generating unit 14 which flows through the directional coupler 24. A preferred limiter 26 is an electric resistor having a value in a range of from about 1 ohm and about 10 megaohms.

The measurement device 10 of the present invention further comprises an electric charge discharge member 36 which is electrically connected in parallel with the storage unit 22. The discharge member 36 is operable to selectively discharge the electric charge stored within the storage unit 22 for purposes of resetting the measurement device 10 for new ultraviolet radiation dose measurements. In this respect, the electric charge in the storage unit 22 is dissipated by the short circuiting action of the discharge member 36 across the storage unit 22. A preferred discharge member 36 is an electric switch having an insulation resistance of not less than about 50 megaohms.

In the preferred embodiment, the electrometric unit 28 of the measurement device 10 is electrically connected to the measuring sensor 44 via a pair of cables 38 which extend therebetween. Those of ordinary skill in the art will recognize that the cables 38 may be integrated into a single coaxial cable 76 which is configured such that the electrometric unit 28 is selectively detachable from the remainder of the measurement device 10. The cables 38 each preferably have an insulation resistance of not less than about 100 megaohms, and a length in a range of from about 2 and 200 inches. When the cables 38 are employed in the present measurement device 10, it is contemplated that all of the components of the electrometric unit 28 and the measurement sensor 44 will be enclosed in their own respective housings 74 and 78, as described in further detail below. The housings 74 and 78 are electrically connected to each other via the cables 38 or cable 76 and, as indicated above, are selectively detachable from each other. Such separability allows the components of the measurement sensor 44 to be positioned in a desired measurement location, with the connection of the electrometric unit 28 thereto occurring only when it is desired to obtain an ultraviolet radiation measurement based on the electric charge stored within the storage unit 22. Indeed, ultraviolet radiation measurements may be obtained up to 24 hours subsequent to the exposure of the generating unit 14 to the ultraviolet radiation 12.

When the components of the measuring device 10 are separately housed, the electric charge generating unit 14 along with the optical attenuator 16, optical band filter 18, the internal light guide 52 and the optical window 20 may be disposed within a substantially cylindrical housing 78 having an opening for permitting the passage of ultraviolet radiation 12 from the ultraviolet radiation source 60 to the electric charge generating unit 14 via the light pathway 50. Preferably, housing 78 is fabricated from an aluminum or stainless steel material, having a diameter in a range of from about 5 mm to about 25 mm and a length of about 2 to 6 inches, with such tube being electrically connected to the electric charge generating unit 14 and electric charge storage unit 22 which may either be disposed within the housing 78 or disposed within the housing 74 of the electrometric unit 28. It will be recognized that all of the components of the measuring device 10 may also be enclosed in a single housing. One such preferred housing 74 is made of a metal or plastic material, and has a cylindrical shape. More particularly, this cylindrically configured housing 74 has a height from about 0.5 inches to about 3 inches and a diameter of from about 3 inches to about 4 inches, with the display 30 of the electrometric unit 28 being mounted on one side thereof.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An ultraviolet radiation measurement device for obtaining a dosage level and an intensity level of ultraviolet radiation from an ultraviolet radiation source directed at an irradiation target, the device comprising:

a measurement sensor having:

a first end;

an opposed second end;

a light pathway formed between the first and second ends;

an internal light guide positioned along the light pathway adjacent the first end;

an external light guide chamber formed along the light pathway adjacent the second end and extending toward the internal light guide, the external light guide chamber being sized and configured to receive an external light guide therein;

an electric charge generating unit positioned adjacent the light pathway, the electric charge generating unit being sized and configured to be irradiated by the ultraviolet radiation source via the light pathway during irradiation of the target and to convert the ultraviolet radiation into an electric charge proportional to the ultraviolet radiation;

an electric charge storage unit electrically connected in parallel with the electric charge generating unit and operable to store the electric charge produced thereby; and a resistive member selectively electrically connectable in parallel with the electric charge storage unit and operable to dissipate the electric charge from the electric charge storage unit during irradiation by the ultraviolet radiation when connected to the storage unit; and an electrometric unit electrically connected to the electric charge storage unit, the electrometric unit being configured to receive the electric charge and operable to selectively output a reading corresponding to the dosage level and the intensity level of the ultraviolet radiation being directed at the irradiation target.

2. The device as in claim 1 wherein the electrometric unit further comprises a measurement switch disposed thereon and movable between intensity and dosage positions, the intensity position being operative to electrically connect the resistive member to the electric charge storage unit and to output the intensity level to the electrometric unit, with the dosage position being operative to electrically disconnect the resistive member from the electric charge storage unit and to output the dosage level to the electrometric unit.

3. The device as in claim 2 wherein the dosage level is outputted to the electrometric unit in a range of from about 1 mJ/cm$^2$ to about 2000 J/cm$^2$.

4. The device as in claim 2 wherein the intensity level is outputted to the electrometric unit in a range of from about 1 mW/cm$^2$ to about 100 W/cm$^2$.

5. The device as in claim 1 further comprising an external light guide disposed in the external light guide chamber along the light pathway.

6. The device as in claim 1 wherein the electrometric unit further comprises first and second channel ports disposed thereon, each of the first and second channel ports being selectively placeable into electrical communication with the measurement sensor.

7. The device as in claim 1 wherein the electrometric unit further comprises a light guide sensor switch disposed thereon and movable between first and second light guide switch positions, the first and second light guide switch positions connecting respective ones of the first and second channel ports to the electric charge storage unit.

8. The device as in claim 1 wherein the electric charge generating unit is releasably electrically connected to the electric charge storage unit via a pair of cables extending therebetween.

9. The device as in claim 8 wherein the cables each have an insulation resistance of not less than about 100 megaohms and a length in a range of from about 2 inches and about 200 inches.

10. The device as in claim 1 wherein the internal light guide is fabricated from a material selected from the group consisting of:

quartz, glass;

plastic;

liquid; and ceramic.

11. The device as in claim 1 wherein the measurement sensor further comprises a light scattering member positioned along the light pathway, the light scattering member being sized and configured to receive the ultraviolet radiation via the light pathway and to split the ultraviolet light into smaller portions.

12. The device as in claim 11 wherein the light scattering member is fabricated from a material selected from the group consisting of:

polytetrafluoroethylene;

low density polyethylene;

medium density polyethylene; and high density polyethylene.

13. The device as in claim 1 further comprising a directional coupler electrically connected in series between the electric charge generating unit and the electric charge storage unit for allowing the electric charge to flow in only a prescribed direction therebetween.

14. The device as in claim 13 further comprising an electric charge limiter electrically connected in series with the directional coupler for limiting the flow of the electric charge through the directional coupler.

15. The device as in claim 14 wherein the electric charge limiter is an electric resistor having a value in a range of from about 1 ohm and about 10 megaohms.

16. The device as in claim 13 wherein:
the electric charge generating unit has a leakage impedance of not less than about 100 megaohms and generates not less than about 1 picocoulomb of the electric charge per 1 joule of ultraviolet radiation;
the directional coupler has a reverse impedance of not less than about 100 megaohms and a direct flow impedance of not more than about 10 megaohms;
the electric charge storage unit has a leakage impedance in ohms of not less than about 10 U/q where U is the electric potential of the storage unit in volts and q is the value of the stored electric charge in coulombs; and
the electrometric unit has an input impedance in ohms of not less than about 20 U/q.

17. The device as in claim 16 wherein the electric charge generating unit is selected from the group consisting of:
a vacuum phototube;
a light emitting diode; and
a solid state photodiode.

18. The device as in claim 16 wherein the directional coupler is selected from the group consisting of:
a silicon rectifier; and
a germanium rectifier.

19. The device as in claim 1 wherein the resistive member has a resistance value of not greater than U/q, where U is the electric potential of the electric charge storage unit in volts, and q is the value of the electric charge stored in the electric charge storage unit in coulombs.

20. The device as in claim 19 wherein the resistive member is a resistor having a resistance value in a range of from about 100 ohms and about 10 megaohms.

21. The device as in claim 1 further comprising:
an optical attenuator disposed between the ultraviolet radiation source and the electric charge generating unit for decreasing the amount of ultraviolet radiation to which the electric charge generating unit is exposed to a prescribed level; and
an optical band filter disposed between the optical attenuator and the electric charge generating unit to limit a spectrum ultraviolet radiation to which the electric charge generating unit is exposed to within a prescribed range.

22. The device as in claim 21 further comprising an optical window disposed between the optical band filter and the electric charge generating unit to protect the electric charge generating unit from dust and moisture.

23. The device as in claim 22 wherein the electric charge generating unit, the optical attenuator, the optical band filter, the internal light guide, and the optical window are disposed within a substantially cylindrical housing having an opening for permitting the passage of ultraviolet radiation from the ultraviolet radiation source to the electric charge generating unit via the light pathway.

24. The device as in claim 21 wherein the prescribed range is in a range from about 185 nm to about 600 nm.

25. The device as in claim 1 further comprising an electric charge discharge member electrically connected in parallel with the electric charge storage unit and operable to selectively discharge the electric charge stored within the storage unit for purposes of resetting the measurement sensor for a new ultraviolet radiation measurement.

26. The device as in claim 25 wherein the electric discharge member is an electric switch having an insulation resistance of not less than about 50 megaohms.

27. The device as in claim 1 wherein the electrometric unit comprises a repulsive charge electrometer.

28. The device as in claim 27 wherein the electrometric unit includes a display and is further operable to convert the electric charge stored in the electric charge storage unit to a reading corresponding to the dosage level and the intensity level of the ultraviolet radiation source to thereby present the reading on the display.

29. The device as in claim 28 wherein the electrometric unit further comprises:
a power supply electrically connected to the display; and
a power switch electrically connected in series between the display and the power supply for selectively applying power from the power supply to the display of the electrometric unit.

30. The device as in claim 29 wherein the electrometric unit is a digital panel electrometer having an input impedance of not less than about 100 megaohms.

31. The device as in claim 29 wherein the power supply is a battery having an electric capacity of at least 10 mAh.

32. The device as in claim 31 wherein the switch has an insulation resistance of not less than about 50 megaohms.

33. An ultraviolet radiation measurement device for obtaining a dosage level and an intensity level of ultraviolet radiation from an ultraviolet radiation source directed at an irradiation target, the device comprising:
a plurality of measurement sensors, each of the measurement sensors having:
a first end;
an opposed second end;
a light pathway formed between the first and second ends;
an internal light guide positioned along the light pathway adjacent the first end;
an external light guide chamber formed along the light pathway adjacent the second end and extending toward the internal light guide, the external light guide chamber being sized and configured to receive an external light guide therein;
a light scattering member positioned along the light pathway, the light scattering member being sized and configured to receive the ultraviolet radiation via the light pathway and to split the ultraviolet radiation into smaller portions;
an electric charge generating unit positioned adjacent the light pathway, the electric charge generating unit being sized and configured to be irradiated by at least one of the smaller portions of the ultraviolet radiation and to convert the at least one of the smaller portions into an electric charge proportional to the ultraviolet radiation;
an electric charge storage unit electrically connected in parallel with the electric charge generating unit and operable to store the electric charge produced thereby; and
a resistive member selectively electrically connectable in parallel with the electric charge storage unit and operable to dissipate the electric charge from the electric charge storage unit during irradiation by the ultraviolet radiation when connected to the storage unit; and
an electrometric unit electrically connected to the electric charge storage unit of each of the measurement sensors, the electrometric unit being configured to receive the electric charge and operable to selectively output the dosage level and the intensity level of the ultraviolet radiation being directed at the irradiation target.

34. The device as in claim 33 wherein the electrometric unit further comprises a plurality of channel ports disposed thereon, each of the plurality of channel ports being selectively placeable into electrical communication with a respective one of the plurality of measurement sensors.

35. The device as in claim 34 wherein the electrometric unit further comprises a light guide sensor switch disposed thereon and movable between a multiplicity of light guide switch positions, each of the multiplicity of light guide switch positions connecting respective ones of the plurality of measurement sensors to the electrometric unit.

36. A method of obtaining a dosage level and an intensity level of a ultraviolet radiation from an ultraviolet radiation source directed at an irradiation target, the method comprising the steps of:

a) providing a measurement sensor having:
- a first end;
- an opposed second end;
- a light pathway formed between the first and second ends;
- an internal light guide positioned along the light pathway adjacent the first end;
- an external light guide chamber formed along the light pathway adjacent the second end and extending toward the internal light guide, the external light guide chamber being sized and configured to receive an external light guide therein;
- an electric charge generating unit positioned adjacent the light pathway, the electric charge generating unit being sized and configured to be irradiated by the ultraviolet radiation and to convert the ultraviolet radiation into an electric charge proportional to the ultraviolet radiation;
- a electric charge storage unit electrically connected in parallel with the electric charge generating unit and operable to store the electric charge produced thereby; and
- a resistive member selectively electrically connectable with the electric charge storage unit and operable to dissipate the electric charge from the electric charge storage unit during irradiation by the ultraviolet radiation when connected to the storage unit; and
- an electrometric unit electrically connected to the electric charge storage unit of the measurement sensor, the electrometric unit being configured to receive the electric charge and operable to selectively output the dosage level and the intensity level of the ultraviolet radiation being directed at the irradiation target;

b) positioning the measurement sensor adjacent the irradiation target;

c) exposing the electric charge generating unit to the ultraviolet radiation via the light pathway during irradiation of the target;

d) generating an electric charge via the electric charge generating unit which is proportional to the amount of ultraviolet radiation to which the electric charge generating unit is exposed;

e) storing the electric charge in the electric charge storage unit;

f) converting the electric charge via the electrometric unit to a reading which corresponds to the dosage level and intensity level of ultraviolet radiation produced by the ultraviolet radiation source; and g) outputting the intensity level to the electrometric unit continuously without interrupting irradiation of the target.

37. The method as in claim 36 wherein steps (d), (e), and (f) are accomplished without the use of an external power supply other than for the ultraviolet radiation source.

38. The method as in claim 36 wherein the measurement sensor further includes a light scattering member positioned along the light pathway and substantially surrounding the internal light guide, the light scattering member being sized and configured to receive the ultraviolet radiation via the light pathway, and step (b) further includes the step of:

positioning the measurement sensor adjacent the irradiation target to thereby allow the light scattering member to split the ultraviolet radiation into portions, and to direct at least one smaller portion of the portions to the electric charge generating unit and a larger portion of the portions to the irradiation target.

39. The method as in claim 38 wherein the irradiation target is obstructed by less than 10 percent.

40. The method as in claim 39 wherein step (f) further comprises the step of:

electrically connecting the resistive member to the electric charge storage unit to output the intensity level to the electrometric unit.

* * * * *